United States Patent
Ashkenazi

Patent Number: 6,145,410
Date of Patent: Nov. 14, 2000

[54] BANDSAW BLADE

[76] Inventor: Brian I. Ashkenazi, 10430 Wilshire Blvd., Unit 306, Los Angeles, Calif. 90024

[21] Appl. No.: 09/268,208

[22] Filed: Mar. 15, 1999

Related U.S. Application Data

[62] Division of application No. 08/568,305, Dec. 6, 1995, Pat. No. 5,881,610.

[51] Int. Cl.⁷ .................................................. B21D 31/00
[52] U.S. Cl. ............................................. 76/108.1; 76/112
[58] Field of Search ................................... 76/108.1, 112, 76/104.1; 30/350; 451/531; 83/835, 788

[56] References Cited

U.S. PATENT DOCUMENTS

| | | |
|---|---|---|
| 81,986 | 9/1868 | Crane . |
| 1,610,569 | 12/1926 | Maynard .............................. 76/108.1 X |
| 2,479,929 | 8/1949 | Harris . |
| 2,778,169 | 1/1957 | Ball . |
| 3,168,087 | 2/1965 | Anderson . |
| 3,263,669 | 8/1966 | Ashley . |
| 3,272,195 | 9/1966 | Myer et al. . |
| 3,597,884 | 8/1971 | Kaarlela . |
| 4,092,971 | 6/1978 | Viscount . |
| 4,172,440 | 10/1979 | Schneider et al. . |
| 4,187,828 | 2/1980 | Schmid . |
| 4,274,764 | 6/1981 | Multakh .............................. 76/108.1 X |
| 4,287,869 | 9/1981 | Schmid . |
| 4,387,698 | 6/1983 | Bustany . |
| 4,776,316 | 10/1988 | Ashkenazi . |

*Primary Examiner*—Douglas D. Watts
*Attorney, Agent, or Firm*—Blakely, Sokoloff, Taylor & Zafman LLP

[57] ABSTRACT

A method of making a cutting blade using a fiber composite tape formed into a continuous closed loop. The tape is selected and prepared such that at least some of the fibers form an acute angle with the cutting edge.

2 Claims, 2 Drawing Sheets

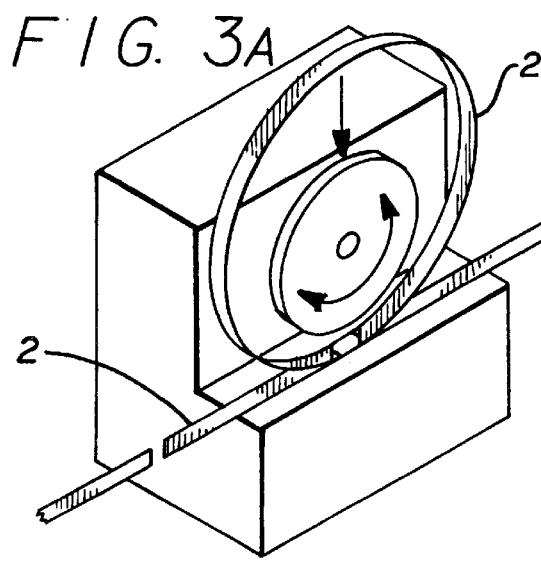
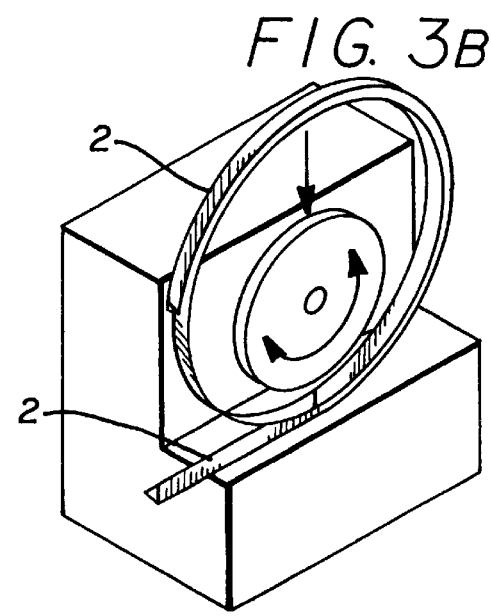
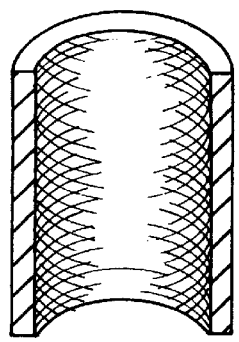
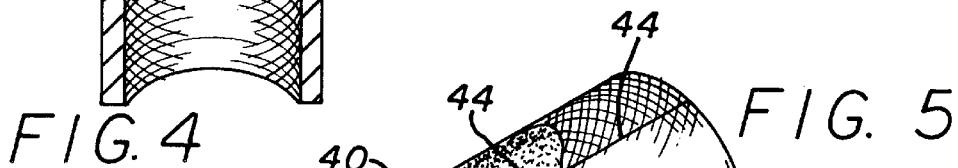
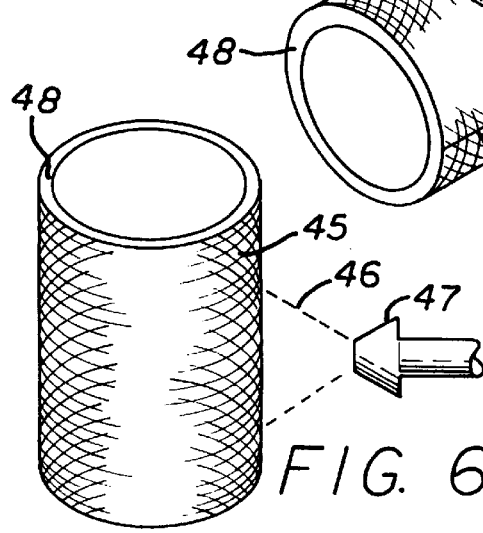
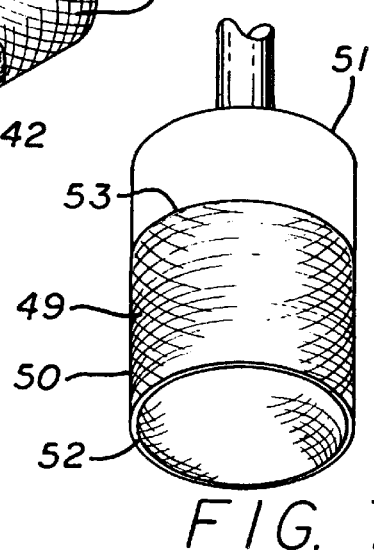

BANDSAW BLADE

This is a divisional of application Ser. No. 08/568,305, filed Dec. 6, 1995, now U.S. Pat. No. 5,881,610.

BACKGROUND OF THE INVENTION

(1) Field of the Invention

This invention relates to cutting blades in the form of bandsaws, coring drills, and other blades having a similar closed loop configuration.

(2) Related Art

Fiber composite tape has been used to construct cutting blades for use in wafering. In U.S. Pat. No. 4,776,316 to this inventor, formation of reciprocating flat blades is described. In an exemplary embodiment, boron-epoxy tape is layered such that a multidirectional orientation of fibers is achieved. An abrasive material such as fine mesh diamond powder is impregnated onto the outermost surfaces. Blades can then be cut from the multi-layer composite such that when connected to a source of reciprocating motion, the exposed fibers at the edge effect a chiseling action on materials fed into the blade. The abrasive outer surface performs a polishing action which results in a smoother, more precise finish.

In the past, bandsaws have typically employed a thin metal band having a serrated edge, or sequential carbide bits, with lateral relief on both sides of the metal band running unidirectionally along the band to provide a cutting surface and prevent the metal band from jamming in the cut. Such blades tend to be somewhat imprecise, and the maximum speed at which they can be operated is limited by the mechanical properties of the material employed. Further, they tend to dull quickly when used to cut hard ceramics or similar substances, and production of a blade of sufficient precision for many ceramic applications is quite expensive. Similarly, prior art coring drills employ a metal bit having a serrated edge of a desired diameter. Production of such bits for ceramic coring is both difficult and expensive. Accordingly, it is desirable to find a cost effective way to produce precision cutting blades for bandsaws, coring drills and the like. It is particularly desirable that: the blades be suitable for cutting very hard materials. Additionally, if the blades can be made lighter without negatively affecting their structural integrity, it would be possible to run them at higher speeds, thereby increasing the speed and precision of each cut.

BRIEF SUMMARY OF THE INVENTION

A method of making precision cutting blades is disclosed. A fiber composite tape of a desired dimension is configured to form a continuous closed loop. At least some of the fibers of the composite tape form an acute angle with the cutting edge. Abrasive materials may be introduced on the surfaces of the composite tape to provide a better finish when the resulting blade is used. The composite blade is cured by conventional curing techniques. Such curing is dependent on the matrix and fabrication techniques employed. By this method, a blade of nearly any diameter can be produced.

BRIEF DESCRIPTION OF THE DRAWINGS

FIG. 3a shows a closed loop being attached to the interior of a second tape strip.

FIG. 3b shows the strips being laminated together to form a multi-layer blade.

FIG. 4 shows a sectional view of a cylindrical mold of a second embodiment of the invention.

FIG. 5 shows a cutaway view of layering around a cylindrical drum of a third embodiment of the invention.

FIG. 6 shows a cylindrical drum and resin sprayer of a fourth embodiment of the invention.

FIG. 7 shows a coring drill bit made using the invention.

DETAILED DESCRIPTION OF THE INVENTION

The present invention teaches a method of making precision cutting blades. In the following description, numerous specific details are set forth in order to provide a thorough understanding of the present invention. It should be clear to one of ordinary skill in the art that the present invention may be practiced without using these specific details. In other instances, well known methods and structures have not been described in detail so as not to unnecessarily obscure the present invention.

Figure 1:
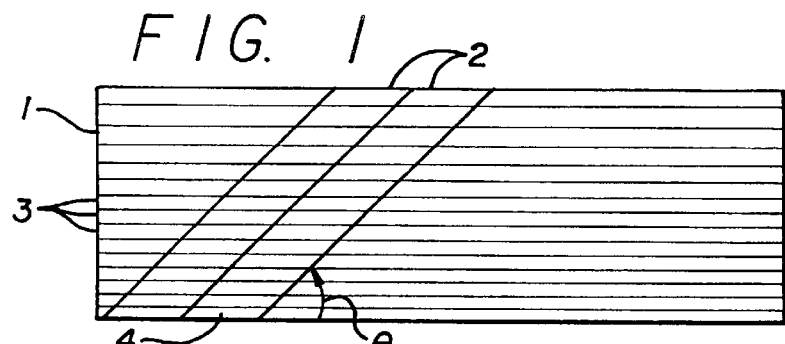
FIG. 1 shows preparation of the tape layers in one embodiment of the instant invention.
Figure 1A:
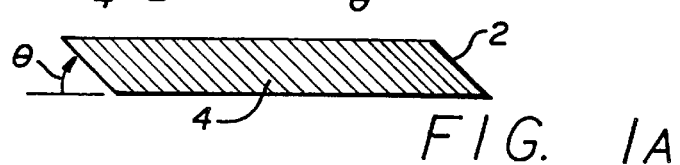

FIG. 1 shows a sheet of composite tape of the type commonly known as "prepreg." The tape comprises a unidirectional fiber mat or multidirectional fiber cloth pre-impregnated with a resin such as epoxy. In one exemplary embodiment, strips of tape 2 are cut from sheet 1 such that the cut forms an acute angle $\theta$ with the unidirectional fibers 3 of the composite tape. The selected composite tape should have a backing which retains the fibers position and orientation after the cut. Cellotape backings have been found suitable.

Figure 2A:
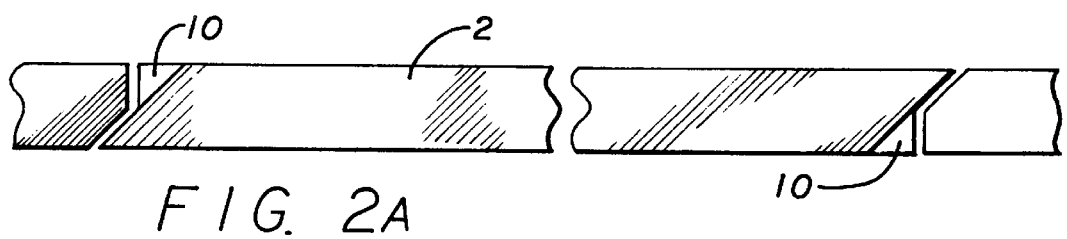
FIG. 2a shows cropping of the prepared layer in one embodiment of the invention.
Figure 2B:
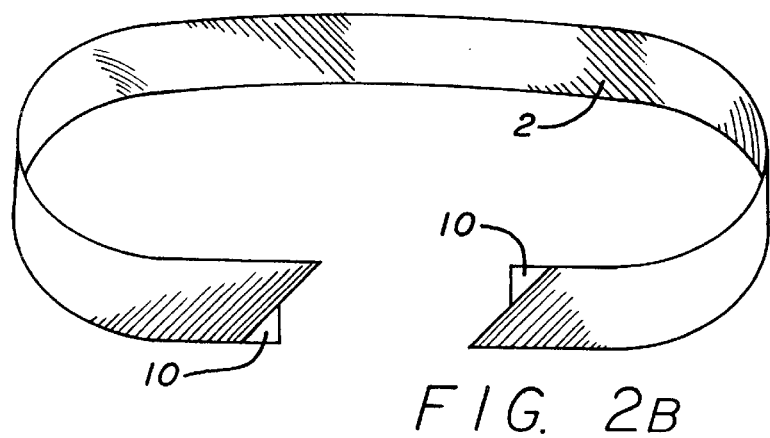
FIG. 2b shows configuring the tape in a closed loop.

As shown in FIGS. 2a and b, the strips 2 are then cropped, thereby creating tabs 10. Any short fibers on tabs 10 should be removed leaving a fiberless tape backing exposed. The strip can then be configured into a closed loop as shown in FIG. 2b with tabs 10 adhering the respective ends together, such closed loop constituting a first layer of a laminated saw blade. While a single layer could be employed, laminating additional layers thereto increases the strength and durability of the resultant blade.

FIGS. 3a and 3b depict the lay-up of multiple layers to form the laminated saw blade of the instant invention. Subsequent layers are formed with strips of tape configured as discussed above disposed in a jig press. The joint in each successive layer is staggered with respect to the underlying layer. The strips can be overlaid such that the fibers in adjacent layers are oriented in opposing directions, or a substantially parallel orientation between the fibers of the different layers can be maintained. By overlaying in opposing directions, it is possible to run the resulting blade in either direction. Moreover, the then existing cross pattern of the fiber improves the structural strength and integrity of the blade. After the desired number of layers have been formed, pressure is then applied around the entire circumference of the closed loop causing the layers to adhere to one another. The resulting laminate is placed in a suitable mold and heated in an oven for curing. It will be understood by one of ordinary skill in the art that providing additional layers to the laminate is within the scope and contemplation of the instant invention.

In an exemplary embodiment, it is desirable to make the external surface of any external layers abrasive to provide a smoother finish and a more precise cut. This can be accomplished by distributing an abrasive material such as diamond powder of one or two microns over the surface layers or infusing the uncured or partially cured resin with an abrasive material. Other abrasive materials such as silicon carbide whiskers may be used. The abrasive side surfaces of the blade dispense with the need for lateral relief on either side of blade. Conventional blades require such relief to prevent jamming in the cut. Blades fabricated according to the present invention offer improved handling characteristics since they are less prove to snagging and significantly reduce the likelihood of bodily injury.

FIG. 4 shows a second exemplary embodiment, wherein a suitable fiber mat 40 is infiltrated with either resin or an abrasive resin slurry in a cylindrical mold 41 and allowed to dry, thereby producing a cylindrical composite form. While a suitable blade can be produced simply by introducing a non-abrasive resin to the fiber mat 40, as discussed above, making blade surfaces abrasive provides a better, more precise finish. Depending on the base matrix used, it may be necessary to apply the material by plasma spray, CVD or other conventional fabrication techniques.

A particular fabrication technique that shows promise for use with the present invention involves application of a matrix to a substrate surface which is then specially "converted" to make a hard, wear-resistant coating. For the purpose of fabricating a bandsaw blade, a matrix material, such as titanium, is applied by plasma spray, PVD, CVD or other suitable process to one or more layers of fiber tape. The resulting composite band is then processed to form a hard, abrasive outer layer on the side surfaces of the blade. Processing a titanium matrix by nitriding, for example, yields a titanium nitride outer layer.

Using the process illustrated in FIG. 4, it is also possible to produce a multilayer blade by either overlaying the fiber sheets prior to resin infiltration or additional layers may be added before the base layers are fully cured. In this embodiment, the dimension of the fiber mat 40 used can be such that a single blade is produced or a fiber composite cylinder from which multiple blades can be cut is formed. Blades can be circumferentially cut from a composite cylinder with lasers, water jet or a conventional precision cutting technique. It is important that the final blades have a plurality of fiber forming acute angles with the cutting edge. Accordingly, this feature will dictate mat position within the mold.

FIG. 5 shows a third exemplary embodiment, fiber mats 40 and abrasive foils 42 are interleaved and laminated together around a cylindrical drum 48. While the figure only shows the making of a three layer composite, any number of layers are deemed to be within the scope and contemplation of the invention. It is important to stagger the junctions 44 of the successive layers circumferentially around the drum. This staggering prevents the overlap of multiple junctions 44 creating a weak point in the resulting cylinder/blade product therefrom. The abrasive foil can be made from abrasive+ matrix or abrasive-matrix powders. As with the second alternative embodiment, either a single blade or a composite cylinder can be created. If a composite cylinder is formed, individual blades may be cut from the cylinder as discussed above. Curing may also be necessary.

In a fourth exemplary embodiment, fibers are filament wound or fiber mats 40 are positioned about a cylindrical drum 48. FIG. 6 shows a first mat 45 positioned about a cylindrical drum 48. A resin 46 or resin abrasive mixture 46 is then sprayed onto the fiber mat. Additional fiber mats can be overlaid and sprayed to form additional layers, after which any curing and cutting can be performed as described above.

Significantly, with each described embodiment, the size of the loop (i.e. resulting blade) can be nearly any size, the size being dictated by the size of the cylinder employed or the length of strip cut. Accordingly, blades ranging in size from very large bandsaw blades to very small coring drill blades can be easily produced. FIG. 7 shows a coring drill bit 49 produced employing the instant invention. To produce a coring drill bit 49, the composite blade 50 can be brazed onto a metal tube 51 or it may be attached directly to a drill press. A circular cutting edge 52 is thereby formed opposite the attachment edge 53 which is brazed to a metal tube 51 or attached directly to a drill press. In either case, precision core drilling is created.

In the foregoing specification, the invention has been described with reference to specific embodiments thereof. It will however be evident that various modifications and changes made thereto without departing from the broader spirit and scope of the invention as set forth in the appended claims. The specification and drawings are accordingly, to be regarded in an illustrative rather than a restrictive sense. Therefore, the scope of the invention should be limited only by the appended claims.

What is claimed is:

1. A method of making a coring drill bit comprising the steps of:

providing a fiber composite blade having fibers forming an acute angle with a cutting edge; and attaching an edge opposing the cutting edge to a cylindrical structure such that the blade forms a closed loop.

2. The method of claim 1 wherein the cylindrical structure is a metal tube and the opposing edge is brazed to the metal tube.

* * * * *

UNITED STATES PATENT AND TRADEMARK OFFICE
CERTIFICATE OF CORRECTION

PATENT NO.    : 6,145,410
DATED         : November 14, 2000
INVENTOR(S)   : Ashkenazi It is certified that error appears in the above-identified patent and that said Letters Patent is hereby corrected as shown below:

<u>Title page,</u>
Item [56], References Cited, U.S. PATENT DOCUMENTS, please delete "Myer et al. ." and insert -- Myer et al. -- and please delete "Schneider et al. ." and insert -- Schneider et al. --.

Signed and Sealed this

Second Day of August, 2005

JON W. DUDAS
*Director of the United States Patent and Trademark Office*